United States Patent Office 3,467,162
Patented Sept. 16, 1969

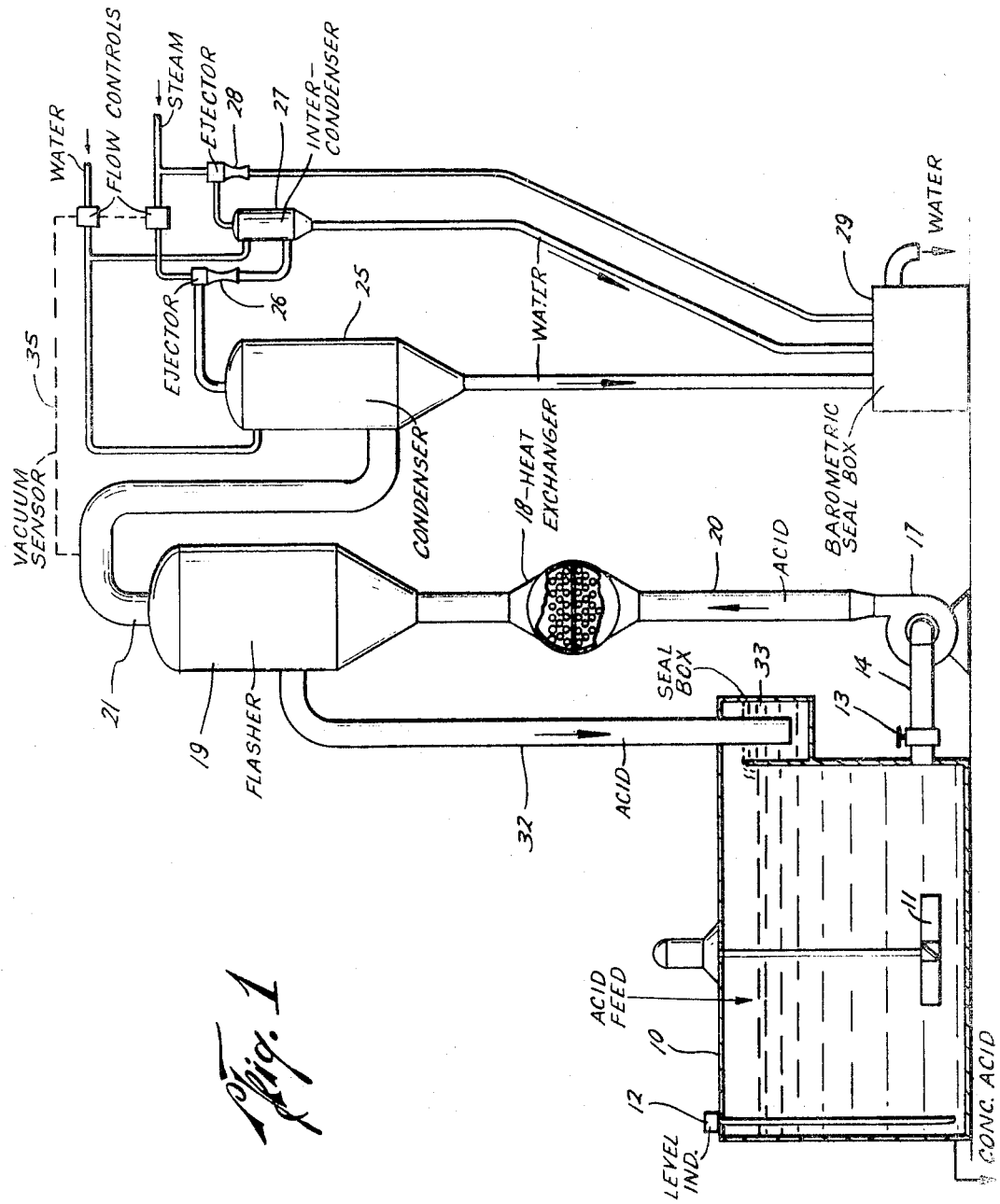

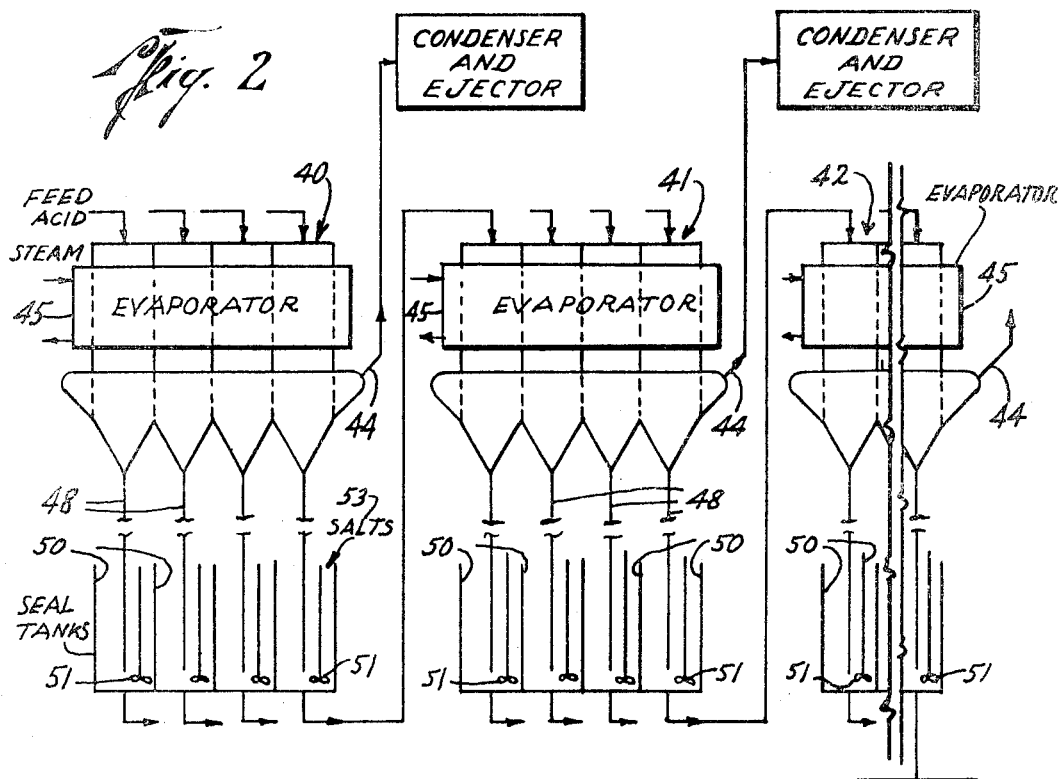

3,467,162
PROCESS OF MAKING CONCENTRATED
PHOSPHORIC ACID OF IMPROVED
CLARITY CHARACTERISTICS
Charles W. Putnam, 2405 N. Crystal Lake Drive,
Lakeland, Fla. 33801
Filed July 11, 1966, Ser. No. 564,343
Int. Cl. B01d 1/02; B01j 17/02
U.S. Cl. 159—47        5 Claims

ABSTRACT OF THE DISCLOSURE

The disclosure is of methods for concentration of wet-process phosphoric acid, especially with regard to clarifying the wet-process phosphoric acid subjected to concentration by evaporation. The clarity of phosphoric acid is adversely affected by salt precipitations on standing and aging, and the disclosure presents methods for eliminating post-precipitation and for avoiding super-saturation of salts by careful attention to the causes thereof.

A principal object of the invention is to provide phosphoric acid in which, after concentration thereof, the precipitated solids occur in an easily separable form.

A further object of the invention is to provide methods and apparatus for concentration of wet-process phosphoric acid such that the resultant more-concentrated acid can be readily clarified.

Other objects of the invention will appear hereinafter.

During evaporation of wet-process phosphoric acid, salts are generally produced which either precipitate or tend to precipitate in the concentrated acid. Wet-process phosphoric acid made from the reaction of phosphate rock and sulphuric acid is generally produced at a concentration of 30% $P_2O_5$, more or less, by weight. Before use in manufacturing other products, such as fertilizer materials, for example, it is customary to concentrate the acid to approximately 54% $P_2O_5$, by weight.

During the concentration step, salts which are at or below saturation in the 30% $P_2O_5$ acid become super-saturated. The rate at which these salts nucleate and crystallize out of solution is widely variable. Some will precipitate out almost instantaneously, some will stand a small amount of supersaturation, while others may take days before nucleation and growth start.

The invention is primarily concerned with the quickly precipitating salts. The invention will, however, be beneficial in growing better crystals of the moderately supersaturating salts; and, with modification, the process can be used in growing crystals of the slowly precipitating salts.

In commercial practice, all of the various methods of concentration used result in a 54% $P_2O_5$ product containing extremely small particles of the quickly precipitating salts. Under adverse conditions these very small particles can cause the acid to become noticeably viscous, and under any conditions these salts are very difficult to separate from the acid. To produce an acid of high clarity it is necessary to resort to rather exotic centrifuges which are expensive and hard to maintain.

The quickly precipitating salts, in general, consist of various fluorine-containing salts . . . fluorides and silicofluorides.

The calcium salts present in the acid tend to super-saturate to a limited extent, particularly in the lower strengths of $P_2O_5$. If there is an excess of sulfuric acid in the wet-process acid, calcium will precipitate out as the sulfate. If there is a deficiency of sulfate ion, calcium may precipitate out as the monophosphate as the acid approaches 54% $P_2O_5$ concentration.

Iron and aluminum will tend to hold a high degree of supersaturation in the 54% $P_2O_5$ acid. Aluminum is usually not present in sufficient quantities to precipitate out, but iron salts may be expected to precipitate if the $Fe_2O_3$ content of the 54% acid is greater than about 1.5%. This precipitation usually occurs sometime after evaporation is completed and is usually referred to as "post-precipitation."

The problem of small sized particles in the concentrated acid is due to excess nucleation, which in turn is due to supersaturated conditions which occur in the various evaporation systems in commercial use. Saturation conditions are exceeded when the solution is concentrated or when its temperature moves in the direction of lower solubility of the solute. These are the usual methods of promoting supersaturation in a solution. During the evaporation of wet-process phosphoric acid, it would be expected that concentration would be the primary cause of supersaturation. Temperatures do not change appreciably and as far as is known, all the salts that could possibly form from the ions in solution have a normal solubility curve with respect to temperature in phosphoric acid containing 30–60% $P_2O_5$ (by weight).

However, in the case of some of the fluorine-containing salts likely to appear in wet-process phosphoric acid, another factor enters into the creation of supersaturation. This is due to the mixing of different strengths of acid together. Due to the concave shapes of the solubility curves of these salts in the acid, the mixture of two different strengths of acid, which are at saturation with respect to the salt, results in an intermediate strength of acid which is decidedly supersaturated. This can be observed from the solubility curves of sodium and potassium silicofluorides in phosphoric acid as 73° C. For example, if 100 grams of 30% $P_2O_5$ acid saturated with sodium silicofluoride, containing 0.84% $Na_2SiF_6$, is mixed with 100 grams of 50% $P_2O_5$ acid saturated with sodium silicofluoride, containing 0.28% $Na_2SiF_6$, the mixture would result in an acid containing 40% $P_2O_5$ and 0.56% $Na_2SiF_6$. However, the 40% $P_2O_5$ acid is saturated at 0.52% $Na_2SiF_6$, giving a supersaturation of 0.04% $Na_2SiF_6$ or approximately 8% of the amount soluble at that strength and temperature. Because of the shape of the solubility curve at that point, any mixtures will be above the saturation curve and the mixture will be supersaturated. The same phenomenon is observed with respect to the solubility curve for potassium silicofluoride.

This phenomenon is not present for either dihydrate or hemihydrate calcium sulfate because the solubility curves of these materials at 80° C. within this $P_2O_5$ concentration range have convex shapes, and any mixtures of different strength acids result in a mixture which is unsaturated. Therefore, during the evaporation of phosphoric acid, excess nucleation of calcium sulphate does not occur due to mixing of acids of different strengths. Calcium sulfate dihydrate crystals will grow to a reasonably large size up until about 45% $P_2O_5$ whereupon these crystals break down and reform as the anhydrite.

A study of the past and present commercial wet-process phosphoric acid evaporation systems shows that mixing of different strengths of acids are common to all of them.

This was true in the days of batch evaporation, when the evaporators were filled to a level with low strength acid and evaporated down to another level, whereupon fresh low strength acid was added to the batch bringing the volume up to the first level again. This process was repeated until the desired acid strength was reached. When continuous processing became the popular thing to do, the same problem occurred in continuous evaporation, no matter what the evaporation process . . . hot gas, submerged combustion, thermal syphon, forced circulation, or falling film. In fact, the practical aspects of continuous evaporation will almost always dictate that acids of different concentrations will be mixed in the system.

This invention overcomes the problems of fine solids formation during the concentration of wet-process phosphoric acid, according to the following principles:

(1) The phosphoric acid is evaporated in some manner in which different strengths of acid are not mixed together. This involves either a batchwise operation in which a bulk of low strength acid is concentrated as an isolated system until it reaches the end strength, or a "plug flow" type of continuous evaporation in which an increment of acid moves continuously through the system coming in contact only with increments ahead and behind of almost identical concentration.

(2) Concentration rate of the acid is very slow to prevent excess nucleation due to too fast a change of concentration. This is self explanatory, but from the practical standpoint, it will mean large batches if batchwise evaporation is used, or adequate surge between steps of continuous evaporation in order to relieve supersaturation before the next step of concentration.

(3) Provisions are made to mix the acid at the evaporating surfaces quickly back into the bulk of the adjacent acid. The purpose of this is twofold:

(a) To prevent any acid from becoming substantially more concentrated than acid with which it might come in contact; and (b) To create a relative motion between crystals in suspension and the bulk of the acid so that the supersaturation in the acid can be dissipated on the crystal surfaces, thereby increasing the size of the crystals and suppressing spontaneous nucleation.

This mixing may be accomplished by any means, such as mechanical agitation or pumping, convection, boiling action, gas injection, etc.

This process may be operated at atmospheric, subatmospheric, superatmospheric pressures alone or in any combination.

There are two alternatives that can be used if different strength acids are to be mixed in the evaporation process (a) quickly heat one or both of the acids to a temperature high enough so that the resulting mixture will be below the labile supersaturation zone, and then proceed with the concentration following principles 2 and 3, above; or (b) mix the acids, allowing the nucleation to take place, then heat the mixture to a sufficient temperature and for a sufficient length of time to redissolve the nuclei formed by the mixing, and then proceed with the concentration following the principles 2 and 3, above.

The drawings indicate preferred embodiments of processes according to the invention, to which reference will be made in the following descriptions of the preferred embodiments, the drawings being as follows:

FIG. 1 is a schematic flowsheet showing a preferred process embodiment.

FIG. 2 is a schematic flowsheet showing a second process embodiment.

FIG. 3 is a schematic flowsheet showing a third process embodiment.

The preferred embodiment, as shown in FIG. 1, illustrates how the invention may be applied using commercially available equipment, but the invention is in no way limited to the exact process of this particular system. The drawing represents a system that will evaporate approximately 150 tons per day of $P_2O_5$ as wet-process phosphoric acid from 30% $P_2O_5$ to 54% $P_2O_5$. Tank 10 provides a reservoir for a batch of acid being evaporated. This tank may be about 30 feet in diameter and about 20 feet high, and is equipped with a pitched blade turbine agitator. The bottom of the tank may be lined with carbon brick. Incorporated in the tank structure is an accurate level measuring indicator, indicated by reference numeral 12. Element 13 is a cutoff valve disposed in outflow line 14 from tank 10. Pump 17 has a pumping rate of approximately 10,000 gallons per minute. It is desirable to equip this pump with a variable speed drive or other device to maintain the pumping rate constant as the head, against which pump 17 pumps, increases during evaporation. A two-pass horizontal shell-and-tube heat exchanger 18 with impervious graphite tubes, acid on the inside, and steam or water on the outside, is connected to the discharge of pump 17 by pipe 20, and connected thereabove is a rubber-lined vacuum flash chamber 19, approximately 12 feet in diameter, which is connected at its upper end outlet 21 to the vacuum system, which includes condenser 25, first stage steam jet ejector 26, intercondenser 27, second stage jet ejector 28, and barometric seal box 29. The flash chamber overflow 32 discharges into a seal box 33 which overflows back into the acid tank 10.

The preferred operating procedure to produce an easily clarifiable concentrated acid is as follows: (1) close valve 13; (2) fill the tank with approximately 95,000 gallons of 30% $P_2O_5$ phosphoric acid, approximately 17 feet 6 inches depth in the tank; (3) measure the level of the acid in the tank; (4) start the agitator 11; (5) open valve 13; (6) set approximately 8.5″ Hg absolute pressure on the vacuum controller 35 (this will give the same height of acid in the overflow leg at sp. gr. of 1.3 for 30% as 2″ Hg will give for 54% at sp. gr. of 1.75); (7) start the condenser water and the intercondenser water; (8) start the steam jet ejectors 26 and 28; (9) when the absolute pressure in the system reaches 8.5″ Hg, start the circulation pump 17; (10) carefully read the level in tank 10 after it reaches equilibrium; take a sample of the recirculating acid and determine its specific gravity; then, analyze the rest of the sample for $P_2O_5$ content; (11) subtract the last level reading from the first level reading. The difference represents the final volume of acid in the parts of the system outside of the tank; (12) manually set the absolute pressure at approximately 5″ Hg; (13) turn the steam on at the heat exchanger, gradually increasing the rate to approximately 30,000 lbs. per hour; (14) when the temperature of the acid overflowing the flash chamber approaches 180° F., set the controller on automatic to hold the temperature at 180° F. by regulating the absolute pressure in the flash chamber; (15) when the acid starts to boil in the flash chamber, adjust the steam rate back to 30,000 lbs. per hour, if necessary.

The system is now in operation. Next, continue with the following steps; (16) periodically check the steam rate, reducing it proportionally as the absolute pressure decreases so that the rate will be about 15,000 lbs. per hour by the time the absolute pressure reaches 2″ Hg; (17) When the $P_2O_5$ analysis of the sample taken in step 10 is reported, calculate what level in tank 10 the acid will reach by the time it has been concentrated to 54% $P_2O_5$:

Final level = Initial level
$$\times \frac{\text{Sample } P_2O_5}{54.0} \times \frac{\text{Sample sp. gr.}}{\text{Assumed sp. gr. of Final Acid}}$$
—Level difference from step (11)

(18) when the acid level in tank 10 reaches the level calculated in step 17, check the specific gravity of the recirculating acid and, if the specific gravity is within the desired limits, turn off the steam to the heat exchanger; (19) start water flowing through the heat exchanger, gradually bringing the rate up to approximately 1500 to 2000 gallons per minute, leaving the vacuum on as this assists the circulation pump; (20) when the acid in the tank reaches approximately 115° F., turn off the water to the heat exchanger, turn off the circulating pump 17 and close valve 15, and then drain the circulation system; (21) turn off the agitator in the tank, and allow the contents of the tank to stand unagitated along enough to settle out sufficient solids to seed the next batch, then empty the tank.

The system is now ready for the next cycle.

The various principles of the process are applied in the above described system.

The phosphoric acid will be evaporated in a manner in which different strengths of acid are not mixed together, because the system is operated batchwise with no fresh acid being introduced, because the contents of the reservoir tank is constantly kept at a uniform concentration by agitation, and because a high circulating rate through the heater and flash chamber prevents any large local change of concentration due to evaporation.

The concentration rate of the acid is very slow, thus preventing excess nucleation due to too fast a change of concentration, since a large batch is evaporated over a period of almost 24 hours, since a high recirculation rate will allow only a slight local increase of concentration at the evaporation surfaces, since heating occurs quickly and immediately before flashing, tending to reduce supersaturation of the acid in the evaporation zone, and since slow cooling of the concentrated acid is provided in the systems to stabilize the acid at a temperature near ambient temperature.

Provision is made to mix the acid at the evaporating surfaces quickly back into the bulk of the acid, in that the evaporating surface is at the top of the liquid in the flash chamber, which liquid is continually and quickly spilling down the overflow leg back into the tank where it is quickly mixed into the bulk of the acid, and because agitation in the tank also keeps crystals in suspension upon the which the supersaturation in the acid can expend itself, and, as noted in step 21, provision has been made to supply additional crystals from the previous batch to assist in the desupersaturation.

Performance of the method as above provides a 54% $P_2O_5$ wet-process phosphoric acid in which all the salts precipitated during evaporation will be in an easily separable form. The solids, even the fluorine salts, will be of sufficient size that they may be removed practically by settling, liquid cyclones, or filtration. In this way a high-clarity acid may be produced with simple, low-maintenance equipment.

The preferred embodiment of the invention described above is a batchwise operation. The same principles may also be incorporated into an embodiment operated continuously.

Where steam is the desired heating medium, falling film evaporators could be modified, as shown in FIG. 2, so as to embody the principles of the invention. For example, the three evaporators 40–42 could be used. The feeds and outlets of each evaporator body are arranged to provide four separate passes. If desired, up to six passes could be provided. The acid for each pass is kept separate. The vapor outlets 44 and steam chests 45 of each evaporator are common to all passes in that body. Each pass is connected by its own barometric leg 48 to a seal compartment 50 directly below the evaporator. Each of these seal compartments is equipped with an agitator 51, and is of sufficient volume to allow the acid to dissipate (most of) its supersaturation before going to the next pass. The acid passes, from left to right, through the evaporator passes, the acid leaving one pass entering the upper inlet to the next pass. Seeding of the acid with previously crystallized salts 53 is desirable to suppress nucleation, and the extent of seeding determines the number of passes required and the retention times required in the seal compartments.

If fuel is used as the source of heat, then a multistage submerged combustion hot gas type of evaporator, well known in the art, could be used. An illustration of such use in presented in FIG. 3. Mixing in each evaporator compartment 60 is supplied by the bubbling gases. As with the falling film evaporator, seeding of the acid would cut down on the nucleation. Seeding would tend to cut down on the number of stages and/or the retention time in each compartment. The evaporators, in any desired number, operate in series, and each has a combustion burner or hot gas inlet 63, an acid feed conduit 64, and an acid outflow conduit 65, leading to a sump 66. Since the evaporators operate at atmospheric pressure, the temperature of the product is considerably higher than in vacuum type evaporators, and a greater quantity of salts will still be in solution in the acid, and must be crystallized out. This product acid should then be cooled slowly with agitation to allow these dissolved salts to come out of solution onto the crystals present rather than precipitating out. This cooling is accomplished in a plurality of compartments 67 (one being shown) following the last evaporator stage into each of which air would be blown through a suitable inlet 68 to cool and mix the acid.

In both of the continuous systems described, mixing of widely differing strengths of acid is avoided; concentration takes place slowly, for example, twelve stages of evaporation with about an hour retention time in each stage; and mixing is provided to maintain uniformity in each stage and to promote liquid-crystal contact.

While preferred embodiments of the invention have been described and shown, many modifications thereof may be made by a person skilled in the art without departing from the spirit of the invention, and it is intended to protect by Letters Patent all forms of the invention falling within the scope of the following claims.

I claim:

1. The process of concentrating wet process phosphoric acid by evaporation wherein the solids precipitated during evaporation are of large enough size to permit their easy removal from the concentrated acid, and wherein the phosphoric acid concentration is increased from an initial concentration of about 30% $P_2O_5$ by weight to a final concentration of up to about 54% $P_2O_5$ by weight, said process comprising maintaining a large body of vigorously agitated acid to be concentrated, continuously concentrating portions of acid from said large body of acid no larger in volume than about 10% of the volume of said large body of vigorously agitated acid, by quickly heating said portions of acid to a temperature high enough so that the heated acid is below the labile supersaturation region and the evaporation and consequent concentration thereof is of a low degree to prevent excess nucleation due to too rapid a change in concentration, rapidly and continuously mixing the heated and concentrated portions back into said large body of vigorously agitated acid whereby said heated and concentrated portions of acid are rapidly distributed throughout said large body of vigorously agitated acid to prevent any acid from being substantially more concentrated than acid with which it may come in contact and thereby to maintain a continuous uninterrupted motion of crystals in suspension and the bulk of the acid to continuously dissipate its supersaturation on the crystal surfaces and thereby increasing the crystal size and suppressing nucleation.

2. Process according to claim 1, including adding seed crystals to the acid to promote the desupersaturation of the acid and the growth of larger crystals.

3. Process according to claim 1, wherein the wet process phosphoric acid is a mixture of acids of different concentrations prepared by heating at least one of the acids to be mixed to a temperature high enough and quickly enough with respect to any solids present that the mixture of acids is below the labile supersaturation zone.

4. Process according to claim 1, wherein the wet process phosphoric acid is a mixture of acids of different concentrations prepared by mixing the acids and heating the mixture to a sufficient temperature and for a sufficient length of time that the small crystal nuclei formed by the mixing are redissolved.

5. The process according to claim 1, wherein said heated and concentrated portions of acid are rapidly and continuously mixed as described into another large body of vigorously agitated acid maintained at a $P_2O_5$ concentration about 2% higher than the $P_2O_5$ concentration of said first-named large body of vigorously agitated acid.

References Cited

UNITED STATES PATENTS

| 3,118,731 | 1/1964 | Suanoe. | |
| 3,314,757 | 4/1967 | Myon | 159—47 X |
| 3,317,306 | 5/1967 | Getsinger et al. | |
| 3,333,929 | 8/1967 | Mazurek et al. | 159—45 X |

NORMAN YUDKOFF, Primary Examiner

J. SOFER, Assistant Examiner

U.S. Cl. X.R.

23—165, 306; 159—13, 45